United States Patent
Boeuf et al.

(10) Patent No.: US 11,686,992 B2
(45) Date of Patent: Jun. 27, 2023

(54) CAPACITIVE OPTICAL MODULATOR

(71) Applicant: STMicroelectronics (Crolles 2) SAS, Crolles (FR)

(72) Inventors: Frédéric Boeuf, Le Versoud (FR); Cyrille Barrera, Grenoble (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 65 days.

(21) Appl. No.: 17/476,668

(22) Filed: Sep. 16, 2021

(65) Prior Publication Data

US 2022/0004076 A1  Jan. 6, 2022

Related U.S. Application Data

(63) Continuation of application No. 16/931,090, filed on Jul. 16, 2020, now Pat. No. 11,150,533.

(30) Foreign Application Priority Data

Jul. 19, 2019 (FR) ...................................... 1908189

(51) Int. Cl.
*G02F 1/225* (2006.01)
*G02F 1/025* (2006.01)
*G02F 1/035* (2006.01)

(52) U.S. Cl.
CPC ............ *G02F 1/2257* (2013.01); *G02F 1/025* (2013.01); *G02F 1/035* (2013.01); *G02F 2202/103* (2013.01)

(58) Field of Classification Search
CPC ........ G02F 1/2257; G02F 1/025; G02F 1/035; G02F 2202/103
See application file for complete search history.

(56) References Cited

U.S. PATENT DOCUMENTS

| 10,921,517 B2 * | 2/2021 | Ogawa .................. G02F 1/2257 |
| 10,996,539 B2 * | 5/2021 | Takahashi ............. G02F 1/2257 |
| 2018/0074349 A1 | 3/2018 | Fujikata et al. |

OTHER PUBLICATIONS

Boeuf, Frederic, et al., "Challenges in Silicon Photonics Process Technology", 2017 European Conference on Optical Communication, IEEE, Sep. 17, 2017, 3 pages.

(Continued)

*Primary Examiner* — John Bedtelyon
(74) *Attorney, Agent, or Firm* — Slater Matsil, LLP

(57) ABSTRACT

A capacitive electro-optical modulator includes a silicon layer having a cavity having sidewalls and a floor. A germanium or silicon-germanium strip overlies the silicon layer within the cavity. A silicon strip overlies the germanium or silicon-germanium strip within the cavity. The silicon strip is wider than the germanium or silicon-germanium strip. An insulator fills the cavity laterally adjacent the germanium or silicon-germanium strip and the silicon strip and extending between the sidewalls of the cavity. An upper insulating layer overlies the silicon strip and the insulator. A layer of III-V material overlies the upper insulating layer. The layer of III-V material formed as a third strip is arranged facing the silicon strip and separated therefrom by a portion of the upper insulating layer.

27 Claims, 4 Drawing Sheets

(56) References Cited

OTHER PUBLICATIONS

Takenaka, Mitsuru, et al., "Heterogeneous CMOS Photonics Based on SiGe/Ge and III-V Semiconductors Integrated on Si Platform", IEEE Journal of Selected Topics in Quantum Electronics, vol. 23, No. 3, May/Jun. 2017, 13 pages.

Takenaka, Mitsuru, et al., "III-V/Si Hybrid MOS Optical Phase Modulator for Si Photonic Integrated Circuits", 2018 European Conference on Optical Communication, IEEE, Sep. 23, 2018, 3 pages.

Hiraki, T., et al., "Heterogeneously Integrated III-V/Si Mach-Zehnder Modulator", The 23rd OptoElectronics and Communications Conference (OECC 2018), Jul. 2-6, 2018, Jeju, Korea, 2 pages.

Menezo, Sylvie, et al., "High-Speed Heterogeneous InP-on-Si Capacitive Phase Modulators", Optical Society of America, 2018, 3 pages.

Han, Jae-Hoon, et al., "Efficient low-loss InGaAsP/Si hybrid MOS optical modulator", Nature Photonics, Macmillan Publishers Limited, Published online Jul. 24, 2017, 6 pages.

\* cited by examiner

CAPACITIVE OPTICAL MODULATOR

CROSS-REFERENCE TO RELATED APPLICATIONS

This application is a continuation of U.S. patent application Ser. No. 16/931,090, filed on Jul. 16, 2020, which claims priority to French Patent Application No. 1908189, filed on Jul. 19, 2019, which applications are hereby incorporated herein by reference.

TECHNICAL FIELD

The present disclosure generally concerns electro-optical integrated circuits and particular embodiments related to a capacitive optical modulator.

BACKGROUND

Hybrid capacitive electro-optical modulators of III-V/silicon or III-V/Si type are known. In such modulators, a strip of a silicon layer is coated, on at least part of its length, with a strip of a layer of III-V materials separated from each other by an insulating layer. The stacking of the silicon strip, of the insulating layer, and of the strip of III-V material defines a waveguide having a longitudinal direction corresponding to the longitudinal direction of the strips. Further, the two strips correspond to two electrodes of a capacitor. By applying a voltage across the capacitor, the resulting charge storage on either side of the insulating layer arranged between the two strips enables to modulate the effective optical index of the waveguide, and thus to modulate an optical signal propagating therethrough.

SUMMARY

Embodiments disclosed herein can overcome all or part of the disadvantages of known hybrid III-V/Si-type capacitive electro-optical modulators and of methods of manufacturing such known modulators. For example, an embodiment overcomes all or part of the disadvantages of known hybrid III-V/Si-type capacitive electro-optical modulators.

In a particular embodiment, a hybrid III-V/Si-type capacitive electro-optical modulator is provided where the thickness of the silicon strip and of the strip of III-V materials can be chosen, for example, a thickness of the silicon strip which is smaller than the thickness of a silicon-on-insulator layer of an integrated circuit comprising the modulator.

Another embodiment provides a method of manufacturing a hybrid III-V/Si-type capacitive electro-optical modulator that can overcome all or part of disadvantages of known methods of manufacturing such a modulator.

In another embodiment, a method of manufacturing a hybrid III-V/Si-type capacitive electro-optical modulator is disclosed. The thickness of the silicon strip and of the strip of III-V materials may be chosen, for example, a thickness of the silicon strip which is smaller than the thickness of a silicon-on-insulator layer of an integrated circuit comprising the modulator.

An embodiment provides a method comprising the successive steps of: a) etching a cavity in a first silicon layer while leaving in place, at the bottom of the cavity, a second silicon layer corresponding to a portion of the thickness of the first layer; b) growing in the cavity, by epitaxy from the second layer, a third germanium or silicon-germanium layer; c) growing in the cavity, by epitaxy from the third layer, a fourth silicon layer to fill the cavity; d) defining by etching all the way to the second layer a first strip in the fourth layer and a second strip in the third layer, the first strip resting on the second strip and having a same width as the second strip; e) selectively etching a portion of the second strip to decrease the width of the second strip; f) filling with an insulator cavities arranged on either side of the first and second strips; g) depositing an insulating layer; and h) bonding, by molecular bonding, a layer of III-V materials to the insulating layer.

According to an embodiment, the etching of step d) is an anisotropic etching.

According to an embodiment, the etching of step e) is an isotropic etching.

According to an embodiment, step f) comprises the steps of: f1) depositing a layer of the insulator filling the cavities; and f2) performing a chemical-mechanical planarization, CMP, down to the first layer.

According to an embodiment, at step h), the layer of III-V materials has a thickness substantially equal, preferably equal, to that of the first strip.

According to an embodiment, the layer of III-V material is made of InGaAsP or of InP, preferably of InGaAsP.

According to an embodiment, the first strip, the insulating layer, and the layer of III-V material form a capacitive electro-optical modulator.

According to an embodiment, the insulating layer is made of $HfO_2$, $Al_2O_3$, and/or of $SiO_2$, preferably of $Al_2O_3$.

According to an embodiment, the third layer is made of silicon-germanium with a germanium atom concentration in the range from 10 to 20%.

According to an embodiment, the first layer is a layer of silicon-on-insulator, SOI, type and rests on an insulating layer.

Another embodiment provides a capacitive electro-optical modulator that comprises a first silicon layer, a stack of a first germanium or silicon-germanium strip resting on the first layer and of a second silicon strip resting on the first strip. The first strip is narrower than the second strip. An insulator laterally borders the stack and is flush with an upper surface of the second strip. An insulating layer rests on the insulator and the second strip and a layer of III-V materials rests on the insulating layer and comprises a third strip arranged above and opposite the second strip.

According to an embodiment, the first strip, the third strip, and a portion of the insulating layer sandwiched between the first and third strips form a waveguide of the electro-optical modulator.

According to an embodiment, the first layer is a portion of the thickness of a second silicon layer of a silicon-on-insulator (SOI) structure, the first layer resting on an insulating layer of the SOI structure and the second strip being flush with an upper surface of the second layer.

According to an embodiment, the second and third strips have a substantially equal thickness, preferably equal.

According to an embodiment: the first strip is made of silicon-germanium with a germanium atom concentration in the range from 10 to 20%; and/or the layer of III-V materials is made of InGaAsP or of InP, preferably of InGaAsP; and/or the insulating layer is made of $HfO_2$, $Al_2O_3$, and/or of $SiO_2$, preferably of $Al_2O_3$.

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
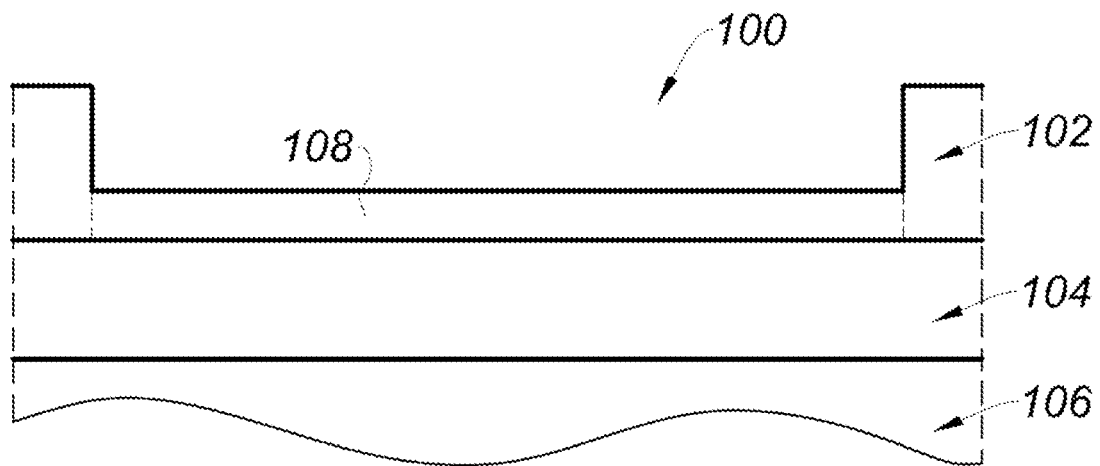
FIG. 1 is a simplified cross-section view illustrating a step of an embodiment of a method of manufacturing a hybrid III-V/Si type electro-optical capacitive modulator.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the integrated optoelectronic circuits and the applications where a modulator such as described may be provided have not been detailed, the described modulators being compatible with usual circuits and applications.

Throughout the present disclosure, the term electrically "connected" is used to designate a direct electrical connection between circuit elements, whereas the term "coupled" is used to designate an electrical connection between circuit elements that may be direct, or may be via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "approximately", "substantially", and "in the order of" are used herein to designate a tolerance of plus or minus 10%, preferably of plus or minus 5%, of the value in question.

Unless otherwise specified, a first layer or a first layer portion resting on a second layer or a second layer portion means that the first layer or layer portion rests on and in contact with the second layer or layer portion.

An embodiment of a method of manufacturing a hybrid III-V/Si-type electro-optical capacitive modulator will now be described in relation with FIGS. 1, 2, 3, 4, and 5, these drawings being cross-section views illustrating steps of the method. The cross-section views of FIGS. 1 to 5 are taken in a cross-section plane orthogonal to a direction of propagation of an optical signal in the modulator, for example, a signal having its wavelength(s) in near infrared, for example, in the range from 1 to 2 µm, preferably equal to approximately 1.3 µm or approximately 1.55 µm, for example, to 1.3 µm or 1.55 µm.

FIG. 1 illustrates a step of an embodiment of a method of manufacturing a hybrid III-V/Si-type electro-optical capacitive modulator.

At this step, cavity too has been etched in a silicon layer 102. Layer 102 is preferably of silicon-on-insulator or SOI type, that is, it rests on an insulating layer 104, for example, made of silicon oxide, itself resting on a support substrate 106, for example, made of silicon.

Cavity too is etched across a portion only of the thickness of layer 102, so that the other portion of the thickness of layer 102 remains in place on layer 104, at the bottom of cavity too. In other words, a silicon layer 108 is left in place at the bottom of cavity too, layer 108 corresponding to the portion of the thickness of layer left in place at the bottom of cavity too. The thickness of layer 108 is for example determined by the etch time.

As an example, the thickness of layer 102 is approximately equal to 300 nm, for example, equal to 300 nm. The thickness of layer 108 is for example in the range from 30 to too nm, for example, approximately equal to 50 nm, preferably equal to 50 nm.

Preferably, although this is not shown in FIG. 1, the cavity extends longitudinally in the direction of propagation of an optical signal in the modulator, that is, here, in a direction orthogonal to the plane of FIG. 1. As an example, in top view, not shown, the cavity has a rectangular shape.

As an example, the width of cavity too, for example, measured along a direction orthogonal to the propagation direction of a signal in the modulator and parallel to the upper surface of layer 108, is in the range from 2 to 5 µm, for example, approximately equal to 3.5 µm, preferably equal to 3.5 µm.

Although this has not been shown in FIG. 1, an etch mask is deposited on layer 102 prior to the etching of cavity too, the etch mask of cavity too comprising an opening emerging onto layer 102, at the location of cavity too.

Figure 2:
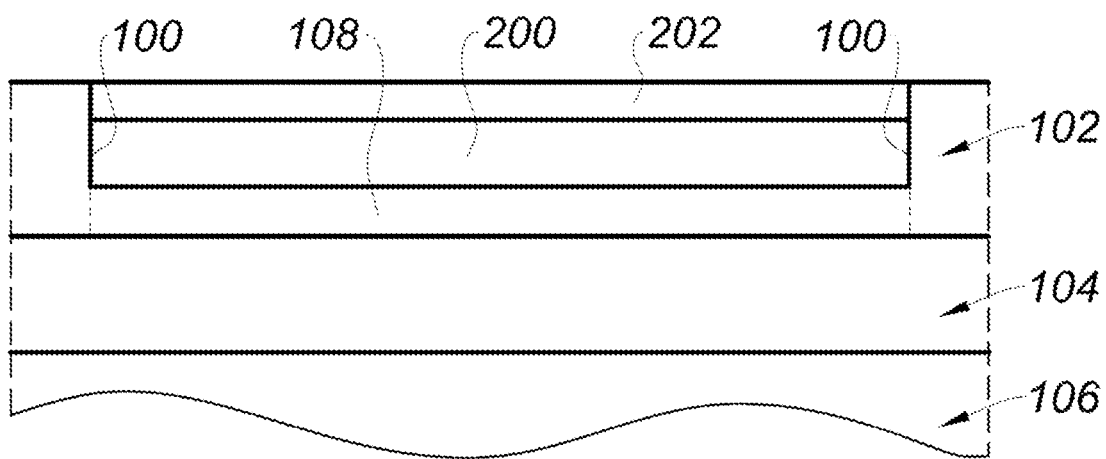
FIG. 2 is a simplified cross-section view illustrating steps of an embodiment of a method of manufacturing a hybrid III-V/Si type electro-optical capacitive modulator.

FIG. 2 illustrates steps of an embodiment of a method of manufacturing a hybrid III-V/Si-type capacitive electro-optical modulator, and more particularly steps carried out after the step of FIG. 1.

At these steps, a germanium or silicon-germanium layer 200, for example, made of silicon-germanium with a germanium atom concentration in the range from 10 to 20%, has been formed in cavity too, all over layer 108. Preferably, layer 200 is formed by epitaxy from layer 108, and more generally from the exposed surfaces of the silicon of layer 108 in cavity too.

The thickness of layer 200 is smaller than the depth of cavity too etched at the step of FIG. 1. In other words, the level of the upper surface of layer 200 is below the level of the upper surface of layer 102.

As an example, the thickness of layer 200 is in the range from 50 to 150 nm, preferably from 80 to 120 nm, for example, equal to approximately too nm, preferably equal to too nm.

A silicon layer 202 is then formed, in cavity too, all over layer 200. Layer 202 is preferably formed by epitaxy from layer 202.

The thickness of layer 202 is selected so that cavity too is filled with layers 200 and 202. Preferably, the thickness of layer 202 is selected so that its upper surface is flush with the upper surface of layer 102.

According to an embodiment, layer 202 is directly formed with the desired thickness.

According to another embodiment, layer 202 is formed with a thickness greater than the desired thickness, and a chemical-mechanical polishing or CMP step is then carried out to take layer 202 down to the desired thickness.

As an example, the thickness of layer 202 is in the range from too to 200 nm, preferably from 125 to 175 nm, for example, approximately equal to 150 nm, preferably equal to 150 nm.

Although this is not shown in FIG. 2, preferably, at the steps of FIG. 2, the mask for etching cavity too is left in place on layer 102.

Figure 3:
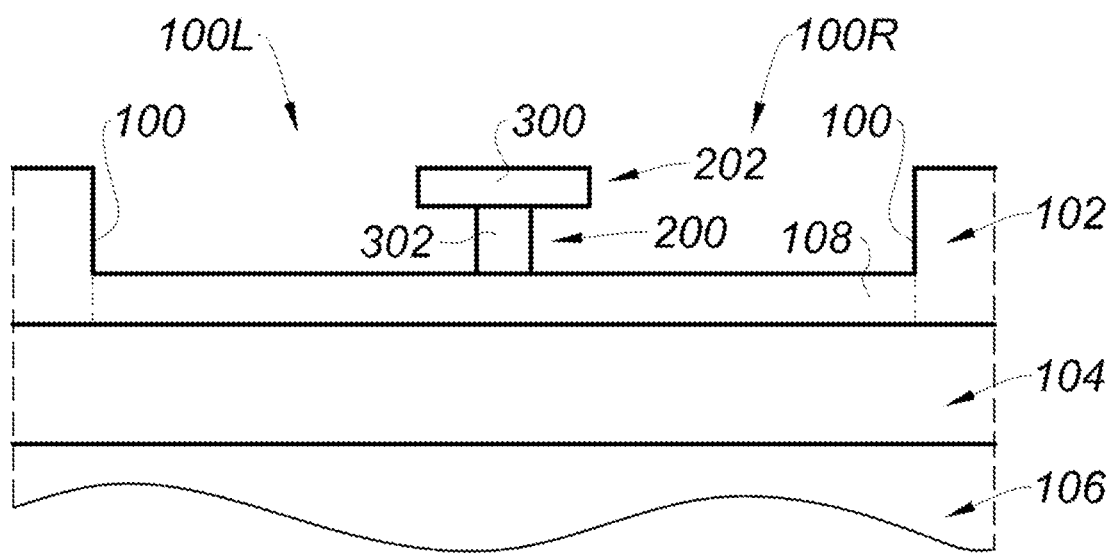
FIG. 3 is a simplified cross-section view illustrating other steps of an embodiment of a method of manufacturing a hybrid III-V/Si type electro-optical capacitive modulator.

FIG. 3 illustrates steps of an embodiment of a method of manufacturing a III-V/Si-type hybrid capacitive electro-optical modulator, and more particularly of the steps carried out after the steps of FIG. 2.

In FIG. 3, a portion of layers 200 and 202 is removed by etching down to layer 108. The etching is implemented to define a first silicon strip 300 in layer 202, and a second germanium or silicon-germanium strip 302 in layer 200, strips 300 and 302 corresponding to portions of respective layers 202 and 200.

Although this is not shown in FIG. 3, strips 300 and 302 extend lengthwise in the propagation direction of an optical signal in the modulator, from one end to the other of cavity 100 taken lengthwise. The stack of layers 300 and 302 is then laterally bordered, all along its length, with two cavities 100L and 100R respectively arranged on either side of the stack. Cavities 100L and 100R correspond to respective portions of cavity 100.

The etching to define strips 300 and 302 is preferably an anisotropic etch step. This etching is for example implemented after the forming of an etch mask resting on layer 202, above and opposite the future strips 300 and 302. Preferably, when strips 300 and 302 are defined, the etch mask of cavity 100 is left in place.

After the etching to define strips 300 and 302, although this is not illustrated herein, silicon strip 300 entirely rests on germanium or silicon-germanium strip 302. In other words, the entire lower surface of strip 300 is in contact with the entire upper surface of strip 302. Still in other words, strips 300 and 302 have a same width and aligned edges.

In FIG. 3, after having defined by etching strips 300 and 302 in respective layers 202 and 200, the width of strip 302 is decreased with respect to that of strip 300.

To achieve this, a step of selective etching of the material of strip 302 over that of strip 300 is implemented. This etch step is an isotropic etch step. As an example, the decrease of the width of strip 302 is determined by the etching time. Preferably, during this etching, the etch mask of cavity 100 and/or the etch mask for defining strips 300 and 302 are left in place.

After having decreased the width of strip 302 with respect to that of strip 300, as shown in FIG. 3, strip 300 comprises a central portion or strip resting on strip 302, and two suspended lateral portions or strips, on either side of strip 302.

As an example, the width of strip 300 is in the range from 300 nm to 5 µm, for example, from 350 to 550 nm, for example, approximately equal to 450 nm, preferably equal to 450 nm. The width of strip 302, after its has been decreased by etching, is for example in the range from 25 to 100 nm, for example, from 25 to 75 nm, for example, equal to approximately 50 nm, preferably equal to 50 nm.

Figure 4:
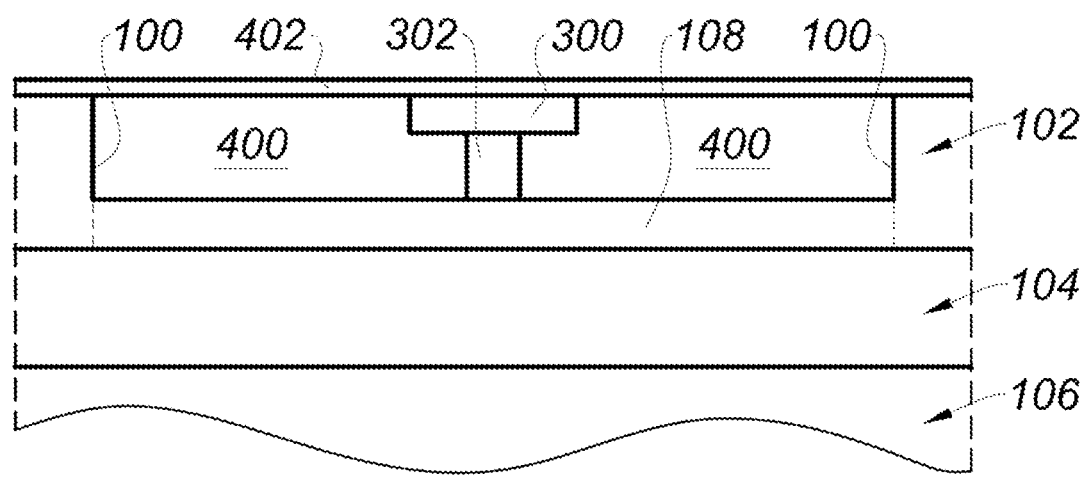
FIG. 4 is a simplified cross-section view illustrating other steps of an embodiment of a method of manufacturing a hybrid III-V/Si type electro-optical capacitive modulator.

FIG. 4 illustrates steps of an embodiment of a method of manufacturing a hybrid III-V/Si-type capacitive electro-optical modulator, and more particularly steps carried out after the steps of FIG. 3.

At these steps, cavity 100, and more exactly cavities 100L and 100R (FIG. 3) arranged on either side of the stack of strips 300 and 302, are filled with an insulator 400, for example, silicon oxide, for example, made of the same insulating material as layer 104.

This step of filling cavities 100L and 100R is implemented so that the upper surface of insulator 400, the upper surface of strip 300, and the upper surface of layer 102 are at the same level. In other words, insulator 400 is flush with the upper surface of layer 102 and the upper surface of strip 300.

According to an embodiment, a layer of insulator 400 is deposited over the entire structure with a thickness greater than or equal to the depth of cavity 100, and thus of cavities 100L and 100R, to totally fill cavities 100L and 100R. A step of chemical-mechanical polishing or CMP down to the upper surface of layer 102 is then implemented.

Preferably, the etch mask of cavity too (step of FIG. 1) and the etch mask to define strips 300 and 302 (step of FIG. 3) are removed prior to the filling of cavities 100R and 100L by insulator 400.

An insulating layer 402 is then deposited over the planar upper surface of the structure, that is, over the upper surface of layer 102, the upper surface of strip 300, and the upper surface of insulator 400. Layer 402 is intended to form the insulator between two electrodes of a capacitor of the modulator, this capacitor enabling to modulate an optical signal propagating in the modulator when a voltage is applied between its two electrodes.

As an example, layer 402 has a thickness in the range from 5 to 15 nm, for example approximately equal to 10 nm, preferably equal to 10 nm. More generally, the thickness of layer 402 is for example adapted according to the targeted application, for example, equal to approximately 5 nm, preferably equal to 5 nm, for a low-voltage operation, or for example equal to approximately 15 nm, preferably equal to 15 nm, for an operation at high frequencies in the order of 35 GHz.

As an example, layer 402 is formed of one or a plurality of insulating layers, for example, of $HfO_2$, $Al_2O_3$ and/or $SiO_2$, preferably of a single $Al_2O_3$ layer. Preferably, layer 402 is, at least on its upper surface side, made of a material selected to allow the molecular bonding of a layer of III-V material to layer 402.

Figure 5:
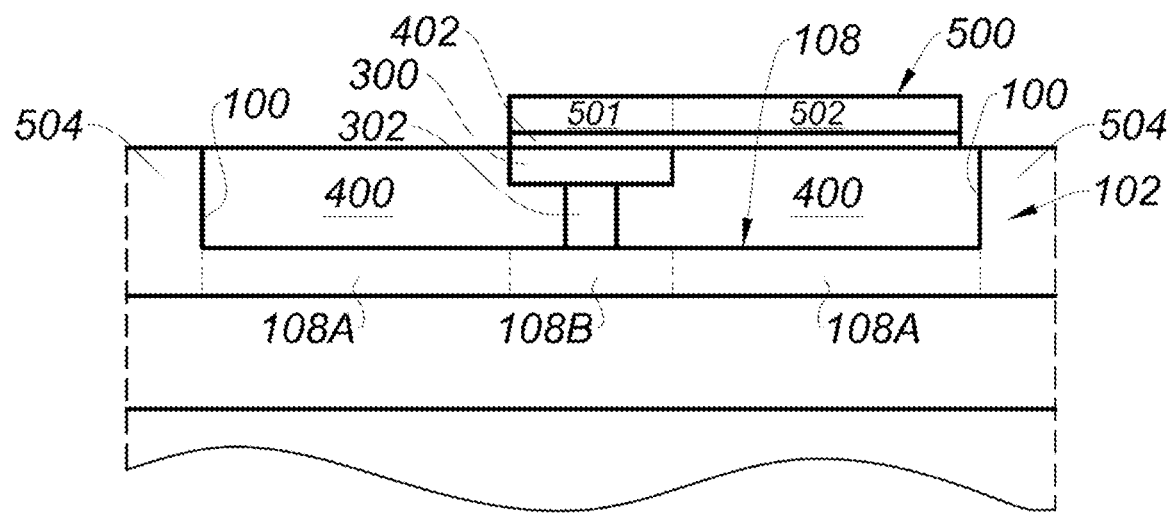
FIG. 5 is a simplified cross-section view illustrating other steps of an embodiment of a method of manufacturing a hybrid III-V/Si type electro-optical capacitive modulator.

FIG. 5 illustrates steps of an embodiment of a method of manufacturing a III-V/Si-type hybrid capacitive electro-optical modulator, and more particularly steps carried out after the steps of FIG. 4.

In FIG. 5, a layer 500 of a III-V material has been bonded to layer 402, by molecular bonding. In other words, layer 500 has been transferred onto layer 402.

According to an embodiment, the thickness of layer 500 before being bonded to layer 402 is already substantially equal, preferably equal, to the thickness of strip 300.

According to another embodiment, the thickness of layer 500 before being bonded to layer 402 is greater than that of strip 300, and the step of bonding or transferring layer 500 onto layer 402 is then followed by a step of etching or CMP to decrease the thickness of layer 500 down to a thickness substantially equal, preferably equal, to the thickness of strip 300.

As an example, the thickness of strip 300 is for example in the range from too to 200 nm, preferably approximately equal to 150 nm, preferably equal to 150 nm.

Further, in FIG. 5, once layer 500 has been bonded to layer 402 and adjusted, if necessary, to the desired thickness, a portion of layer 500 is removed by etching down to layer 402. The etching may be carried on across the entire thickness of layer 402, to remove the portions of layer 402 exposed after the etching of layer 500.

The portion of layer 500 left in place comprises a first portion or strip 501 arranged above and opposite strip 300. In other words, the edges of strips 501 and 300 are aligned. The portion of layer 500 left in place further comprises a second portion or strip 502 extending laterally from strip 501. The two strips 501 and 502 are delimited by dotted lines in FIG. 5. Preferably, strip 502 is only opposite insulator 400.

In the structure or modulator illustrated in FIG. 5, strip 300, strip 501 of layer 500 and the portion or strip or layer 402 interposed between strips 300 and 501 form the waveguide of the modulator. The waveguide is capable of propagating in guided fashion an optical signal to be modulated.

Strip 300 is in contact with strip 302, itself in contact with layer 108, layer 108 being in contact with portions 504 of layer 102 laterally bordering cavity too lengthwise, which portions 504 have not been etched at the step of FIG. 1. Although this is not illustrated herein, the portions 504 of layer 102 are electrically coupled to a first terminal of application of a voltage of the modulator. Portions 504, layer 108, and strips 302 and 300 then form a first electrode of the capacitor of the modulator.

Portions 504, layer 108, and strips 302 and 300 are doped with a first conductivity type, for example, type P.

The strips 501 and 502 of layer 500 are in contact with each other. A portion of strip 502, preferably arranged on the side opposite to strip 501, is electrically coupled to a second terminal of application of a voltage of the modulator. Layer 500 then forms a second electrode of the capacitor of the modulator.

Layer 500 is doped with the second conductivity type, for example, type N.

In the modulator of FIG. 5, when a non-zero voltage is applied between the first and second terminals of the modulator, charges are stored in strip 501, respectively 300, along the strip of layer 402 in contact with strips 501 and 300. This results in a corresponding modification of the optical index of the waveguide of the modulator, and thus in a modulation of the signal propagating in the waveguide of the modulator.

An advantage of the modulator illustrated in FIG. 5 is that the two strips 300 and 502 have the same thickness, which enables to center the optical mode of the signal to be modulated on the strip of layer 402 interposed between strips 300 and 501, where the charge storage is maximum. This results in a better modulation than if this optical mode was off-centered with respect to the strip of layer 402 interposed between strips 300 and 501, as would for example be the case in a modulator where strips 300 and 501 would not have the same thickness.

Further, in the modulator of FIG. 5, the thickness of strips 300 and 501 is different from that of layer 102, without it being necessary to increase the thickness of layer 402. More generally, in the modulator of FIG. 5, the thickness of strips 300 and 501 and the thickness of layer 402 may be selected to obtain a cross-section of the modulator waveguide which corresponds to a given confinement of the optical mode of the signal to be modulated, preferably a maximum confinement of this optical mode in the waveguide. In other words, the thicknesses may be selected to increase, preferably to maximize, the overlapping of the optical mode of the signal to be modulated and of the portions of strips 300 and 501 where charges or free carriers are stored. This results in an increase in the efficiency of the modulation of this optical mode.

Further, the thickness of layer 402 may be selected independently from the thickness of strips 300 and 501, to optimize the operation of the modulator.

Such advantages of the modulator of FIG. 5 particularly result from the method of manufacturing the modulator, described in relation with FIGS. 1 to 5. Indeed, such a method particularly enables to select the thickness of strips 300 and 501, as well as that of layer 402, while keeping, at the step of FIG. 4, a layer 402 having a planar upper surface enabling to bond or to transfer layer 500 of III-V material onto layer 402.

Although this is not illustrated, the previously-described method may comprise an additional step of partially etching layer 500, and more particularly a portion of strip 502 extending from strip 501 to a portion of strip 502 electrically coupled to the second terminal of application of a modulation voltage. This enables to further improve the confinement of the optical mode of the signal to be modulated in the waveguide of the modulator.

According to an aspect of an embodiment, the doping levels in the various layers, regions, portions, strips of the modulator of FIG. 5 may be adapted to optimize the operation of the modulator. As an example:

portions 504 are doped with a first doping level, for example, in the range from $5.10^{19}$ at·cm$^{-3}$ to $5.10^{20}$ at·cm$^{-3}$, preferably equal to $10^{20}$ at·cm$^{-3}$;

first strips 108A of layer 108 laterally extending from portions 504 to a second strip 108B of layer 108 comprising a central portion arranged under and opposite strips 300 and 501, are doped with a second doping level smaller than the first doping level, for example, a second doping level in the range from $10^{19}$ at·cm$^{-3}$ to $10^{20}$ at·cm$^{-3}$, preferably equal to $5.10^{19}$ at·cm$^{-3}$;

strip 108A, strip 302, and strip 300 are doped with a third doping level smaller than the second doping level, for example, a third doping level in the range from $5.10^{18}$ at·cm$^{-3}$ to $5.10^{16}$ at·cm$^{-3}$, preferably equal to $5.10^{17}$ at·cm$^{-3}$;

strip 501 and, preferably, a portion of strip 502 laterally extending from strip 501, are doped with the third doping level;

a central portion of strip 502 is doped with the second doping level; and a lateral portion of strip 502, arranged on the side opposite to 501, is doped with the third doping level.

The portions and the strips doped with the first doping level are located sufficiently far from the modulator waveguide to be doped with the first high doping level, without however disturbing the propagation and the modulation of a signal in the waveguide. The first high doping level enables to decrease the resistivity of these portions and strips, and thus to increase the cut-off frequency of the modulator.

The implementation of the doping steps, with the desired levels, the various regions, strips, portions, layers of the modulator of FIG. 5 is within the abilities of those skilled in the art.

The way in which the waveguide of the modulator is optically coupled or connected to a first silicon waveguide defined in layer 102 and delivering the optical signal to be modulated and to a second silicon waveguide defined in layer 102 and receiving the modulated signal is not detailed and is within the abilities of those skilled in the art. In particular, it will be within the abilities of those skilled in the art to achieve such an optical coupling between the first and second waveguides and the modulator waveguide so as to provide a progressive variation of the effective optical index, for example, by appropriately varying the width of the first and second silicon waveguides and the width of strips 302, 300, 501, and/or 502.

Figure 6:
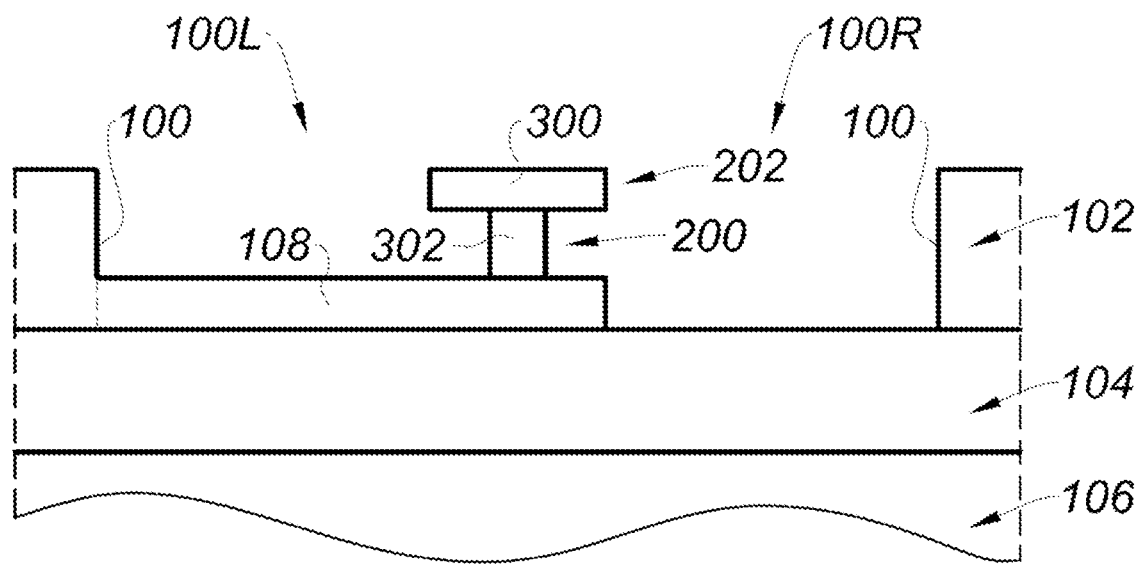
FIG. 6 is a simplified cross-section view illustrating an alternative embodiment of the steps of FIG. 3.

FIG. 6 is a simplified cross-section view illustrating an alternative embodiment of the steps of FIG. 3.

In this variation, in addition to the steps described in relation with FIG. 3, an additional etch step, preferably an anisotropic etching, is provided to suppress the portion of layer 108 arranged on one side of the stack of strips 302 and 300 taken lengthwise, on the right-hand side in the example of FIG. 6.

For this purpose, after having defined strips 300 and 302 from layers 200 and 202, and before or after, preferably before, decreasing the width of strip 302 with respect to that of strip 300, an additional etch mask is formed on the portion of layer 108 to be left in place. In other words still, the additional mask is formed on the portion of layer 108 forming the bottom of one of cavities 100L and 100R, cavity 100R in the example of FIG. 6.

Preferably, at this step, the etch mask of cavity too and the etch mask for defining strips 300 and 302 are left in place, the additional etch mask then overlapping these two masks and resting on the portion of layer 108 to be left in place.

Figure 7:
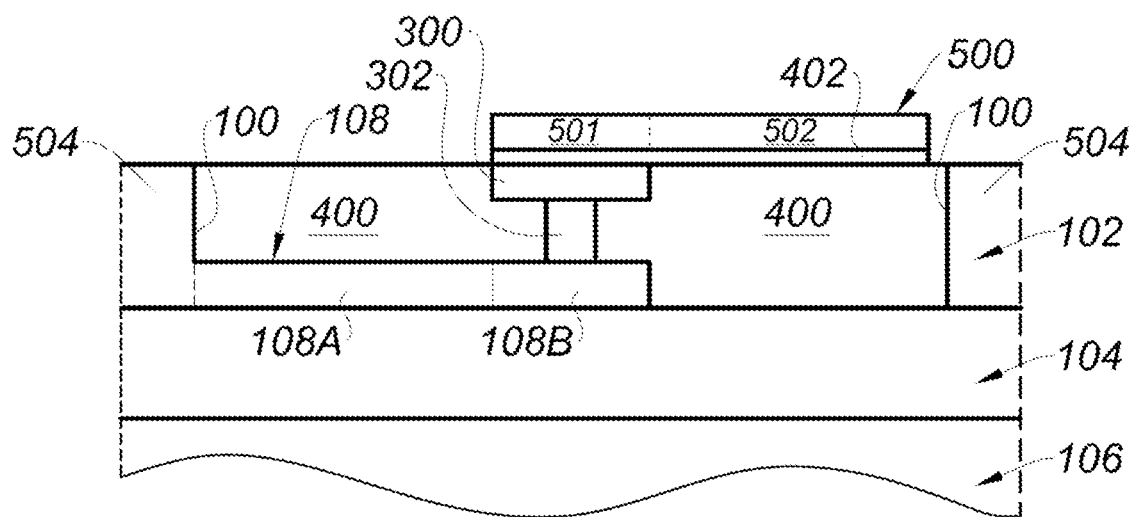
FIG. 7 is a simplified cross-section view illustrating the implementation, after the step of FIG. 6, of the steps of FIGS. 4 and 5.

FIG. 7 is a simplified cross-section view illustrating the modulator obtained after the implementation of the steps of FIGS. 4 and 5 from the structure described in relation with FIG. 6.

In this variation, as compared with what has been described in relation with FIG. 5, during the step of etching layer 500 to only leave in place a strip 501 above strip 300 and a strip 502 extending laterally from strip 501, strip 502 is preferably arranged on the side of strip 501 where layer 108 has been removed by etching during the step described in relation with FIG. 6. Preferably, as shown in FIG. 7, and similarly to what has been described in relation with FIG. 5, strip 502 is only present opposite insulator 400. Further, the portion 504 of layer 102 laterally bordering cavity too on the side of strip 502, that is, the portion 504 arranged on the right-hand side of FIG. 7, may not be coupled or connected to the first terminal of application of a voltage of the modulator. This portion 504 (on the right-hand side of FIG. 7) may be arranged farther from strip 300 than the other portion 504 (on the left-hand side of FIG. 7), for example, to avoid forming a stray capacitance between the portion 504 laterally bordering cavity too on the side of strip 502 (portion 504 on the right-hand side of FIG. 7) and strip 502.

The inventors have observed that the modulator of FIG. 5 or of FIG. 7 enable to reach modulation frequencies greater than 30 GHz, or even greater than 35 GHz, for example, substantially equal to 40 GHz, particularly when the modulator has the previously-indicated preferred dimensions and doping level.

Various embodiments and variations have been described. It will be understood by those skilled in the art that certain features of these various embodiments and variations may be combined, and other variations will occur to those skilled in the art.

Finally, the practical implementation of the described embodiments and variations is within the abilities of those skilled in the art based on the functional indications given hereinabove. In particular, the dimensions, particularly the thicknesses, and/or the doping levels of the different layers, portions, strips of the modulators of FIGS. 5 and 7 may be determined by those skilled in the art according to the optical signal to be modulated, particularly to its wavelengths and to the considered optical mode, and/or to the targeted modulation frequency.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A capacitive electro-optical modulator comprising:
    a silicon-on-insulator substrate that includes a silicon layer and an underlying insulating layer;
    a germanium or silicon-germanium strip overlying the silicon layer;
    a silicon strip overlying the germanium or silicon-germanium strip, the silicon strip being wider than the germanium or silicon-germanium strip;
    an insulator laterally adjacent the germanium or silicon-germanium strip and the silicon strip and having an upper surface that is flush with an upper surface of the silicon strip, a first portion of a lower surface of the insulator separated from the underlying insulating layer of the silicon-on-insulator substrate by the silicon layer and a second portion of the lower surface of the insulator abuts the underlying insulating layer of the silicon-on-insulator substrate;
    an upper insulating layer overlying the insulator and the silicon strip; and
    a layer of III-V material overlying the upper insulating layer, the layer of III-V material formed as a third strip arranged facing the silicon strip and separated therefrom by a portion of the upper insulating layer.

2. The modulator of claim 1, wherein the silicon strip, the third strip, and the portion of the upper insulating layer sandwiched between the silicon strip and the third strip form a waveguide of the capacitive electro-optical modulator.

3. The modulator of claim 1, wherein the germanium or silicon-germanium strip and the silicon strip are disposed in a cavity within the silicon layer.

4. The modulator of claim 1, wherein the silicon strip and the third strip have substantially equal thicknesses.

5. The modulator of claim 1, wherein the germanium or silicon-germanium strip comprises silicon-germanium with a germanium atom concentration in the range from 10 to 20%.

6. The modulator of claim 1, wherein the layer of III-V material comprises InGaAsP or InP.

7. The modulator of claim 1, wherein the upper insulating layer comprises $HfO_2$, $Al_2O_3$ or $SiO_2$.

8. The modulator of claim 1, wherein the layer of III-V material comprises InGaAsP and the upper insulating layer comprises $Al_2O_3$.

9. A method of making the modulator of claim 1, the method comprising:
    etching a cavity in the silicon layer, the cavity having sidewalls and a floor;
    epitaxially growing a germanium or silicon-germanium layer in the cavity, the germanium or silicon-germanium layer being grown from the floor of the cavity;
    epitaxially growing a second silicon layer in the cavity, the second silicon layer being grown from the germanium or silicon-germanium layer to fill the cavity;
    etching the second silicon layer and the germanium or silicon-germanium layer to the floor of the cavity to define the silicon strip in the second silicon layer and germanium or silicon-germanium strip in the germanium or silicon-germanium layer;

selectively etching a portion of the germanium or silicon-germanium strip to decrease the width of the germanium or silicon-germanium strip so that the width of the silicon strip is greater than the width of the germanium or silicon-germanium strip;

etching a portion of the silicon layer to expose a portion of the insulating layer between one edge of the silicon strip and on of the sidewalls;

filling cavity portions arranged on either side of the silicon and the germanium or silicon-germanium strip with the insulator;

depositing the upper insulating layer over the silicon strip and the germanium or silicon-germanium strip; and bonding the layer of III-V material to the upper insulating layer.

10. The method of claim 9, wherein etching the second silicon layer and the germanium or silicon-germanium layer to define the silicon strip and the germanium or silicon-germanium strip comprises anisotropically etching the second silicon layer and the germanium or silicon-germanium layer.

11. The method of claim 9, wherein selectively etching a portion of the germanium or silicon-germanium strip comprises isotropically etching the portion of the germanium or silicon-germanium strip.

12. The method of claim 9, wherein filling the cavity portions comprises:
depositing a layer of the insulator filling the cavity portions; and
performing a chemical-mechanical planarization down to an upper surface of the silicon layer.

13. The method of claim 9, wherein bonding the layer of III-V material to the upper insulating layer comprises layer molecular bonding.

14. The method of claim 9, wherein the layer of III-V material has a thickness substantially equal to a thickness of the silicon strip.

15. The method of claim 9, wherein the layer of III-V material comprises InGaAsP or InP.

16. The method of claim 9, wherein the upper insulating layer comprises $HfO_2$, $Al_2O_3$ or $SiO_2$.

17. The method of claim 9, wherein the layer of III-V material comprises InGaAsP and the upper insulating layer comprises $Al_2O_3$.

18. The method of claim 9, wherein the silicon strip, the upper insulating layer, and the layer of III-V material form a capacitive electro-optical modulator.

19. The method of claim 9, wherein the germanium or silicon-germanium layer comprises silicon-germanium with a germanium atom concentration in the range from 10 to 20%.

20. A capacitive electro-optical modulator comprising:
a silicon layer having a cavity having sidewalls and a floor;
a germanium or silicon-germanium strip overlying the silicon layer within the cavity;
a silicon strip overlying the germanium or silicon-germanium strip and being within the cavity, the silicon strip being wider than the germanium or silicon-germanium strip;
a fill insulator filling the cavity laterally adjacent the germanium or silicon-germanium strip and the silicon strip and extending between the sidewalls of the cavity;
an upper insulating layer overlying the silicon strip and the fill insulator; and
a layer of III-V material overlying the upper insulating layer, the layer of III-V material formed as a third strip arranged facing the silicon strip and separated therefrom by a portion of the upper insulating layer.

21. The modulator of claim 20, wherein the silicon layer overlies an SOI insulator of a silicon-on-insulator substrate, wherein the entire fill insulator is separated from the SOI insulator by the silicon layer.

22. The modulator of claim 20, wherein the silicon layer overlies an SOI insulator of a silicon-on-insulator substrate, wherein a first portion of a lower surface of the fill insulator is separated from the SOI insulator by the silicon layer and a second portion of the lower surface of the fill insulator abuts the SOI insulator.

23. The modulator of claim 20, wherein the fill insulator has an upper surface that is flush with an upper surface of the silicon strip.

24. The modulator of claim 20, wherein the silicon strip, the third strip, and the portion of the upper insulating layer sandwiched between the silicon strip and the third strip form a waveguide of the capacitive electro-optical modulator.

25. A method of operating the modulator of claim 24, the method comprising applying a non-zero voltage between a sidewall of the silicon layer and the layer of III-V material to modulate a signal propagating in the waveguide of the capacitive electro-optical modulator.

26. The method of claim 25, wherein the silicon strip and the third strip have substantially equal thicknesses.

27. The method of claim 25, wherein the signal propagating in the waveguide is modulated at a frequency greater than 30 GHz.

* * * * *